May 20, 1947.  R. T. MONRAD  2,420,673
NAVIGATION DEVICE
Filed March 20, 1945  3 Sheets-Sheet 1

INVENTOR.
Robert T. Monrad
BY Morris Michael Marks
Attorney

May 20, 1947.  R. T. MONRAD  2,420,673
NAVIGATION DEVICE
Filed March 20, 1945  3 Sheets-Sheet 2
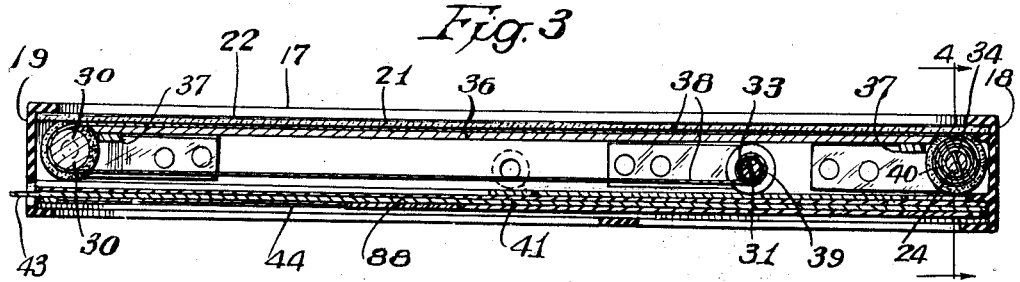
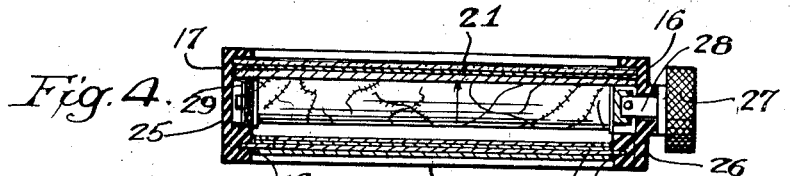
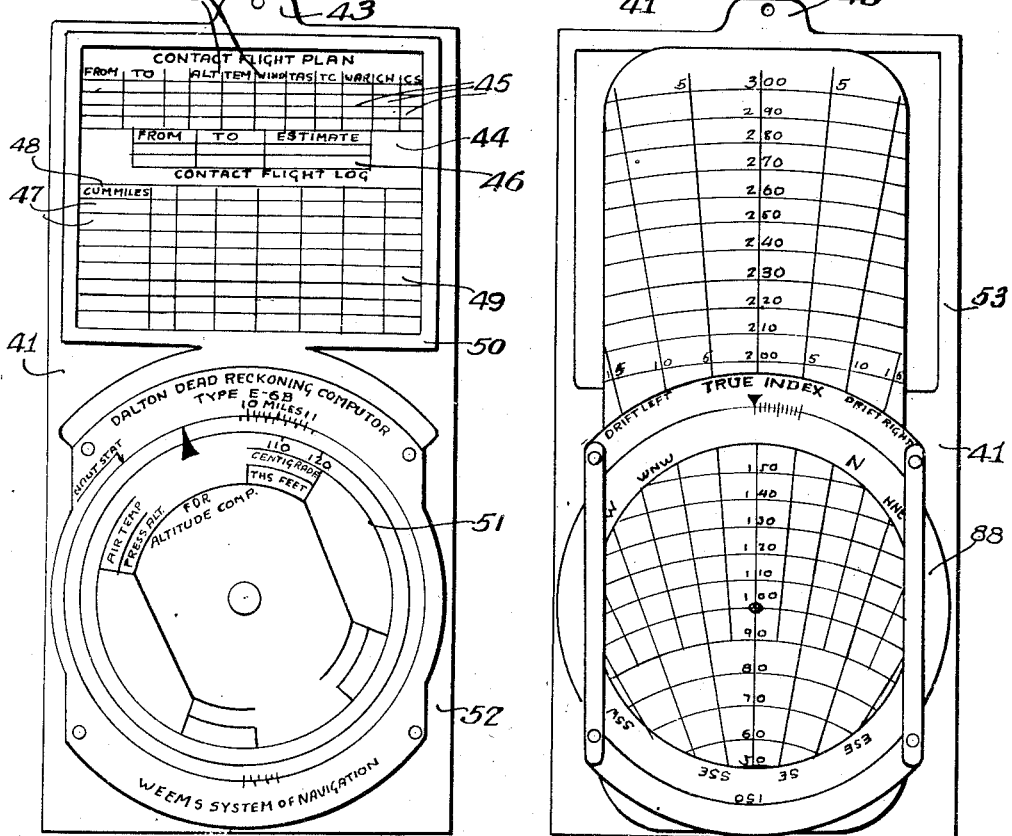
INVENTOR.
Robert T. Monrad
BY Morris Michael Marks
Attorney

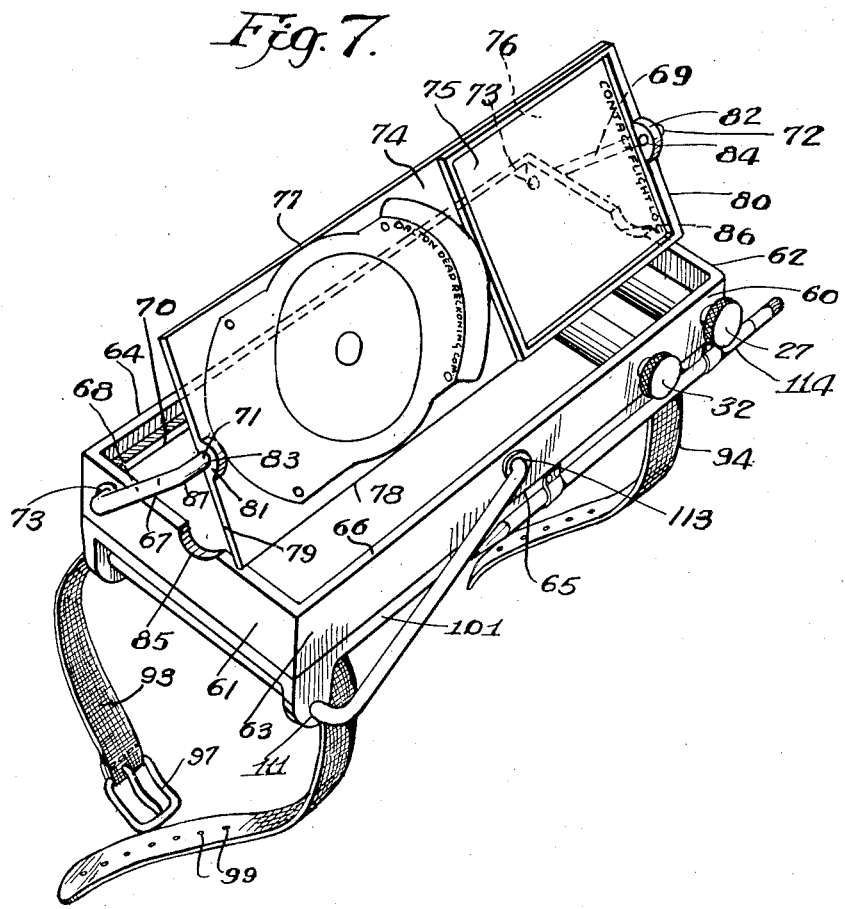

Patented May 20, 1947

2,420,673

UNITED STATES PATENT OFFICE 2,420,673

NAVIGATION DEVICE

Robert T. Monrad, Little Falls, N. Y., assignor of forty per cent to Eric S. Magnus, Philadelphia, Pa.

Application March 20, 1945, Serial No. 583,819

4 Claims. (Cl. 40—28)

My invention relates to navigation devices, and it relates more particularly to means for rendering readily available to a pilot requisite navigational aids, in a manner to enable him to continue piloting the craft while calculating and determining his course.

In travelling from one location to another, over land, it is often necessary for a lone aviator to refer to a map in order to check his course. Not only so, but he must also make computations of flight time, distance, wind direction and velocity, temperature, altitude, etc. In view of the fact that the lone aviator must also pilot his craft while making these computations and checking his position with respect to the map, and that this must usually be done in cramped quarters, it is essential that the mechanical operations involved be reduced to a minimum. Not only so, but it is also essential that such mechanical operations be made with the least possible interference to the mechanical operations required in piloting the craft.

It is one object of my invention therefore, to provide a unitary navigational device which contains within itself all of the requisites to the proper navigation of a craft in flight.

Another object of my invention is to provide a navigation device which is operable by the pilot with minimum interference to the piloting of the craft.

A further object of my invention is to provide a navigation device comprising various aids to navigation so arranged as to cooperate one with another in a manner to facilitate and expedite navigational computation and reference.

Another object of my invention is to provide a navigation device that is facile and inexpensive to manufacture.

With the above and other objects in view, my invention consists of a navigation device comprising the combination of a mounting section comprising navigational aids including a strip map, a navigation computer, tabular forms and navigational indicia correlated thereto; and means for securing said mounting section to a leg portion of a pilot in a manner to render said navigational aids available for use.

My invention also consists of a navigation device comprising a housing having a window; a strip map disposed within said housing; means for progressively bringing portions of said strip map in juxtaposition to said window; a panel; a navigational computer mounted on said panel, and tubular forms disposed on said panel; and means alternately to close said housing and to open said housing for access to the interior thereof.

For the purpose of illustrating my invention, I have shown in the accompanying drawings forms thereof which are at present preferred by me, since the same have been found in practice to give satisfactory and reliable results, although it is to be understood that the various instrumentalities of which my invention consists can be variously arranged and organized and that my invention is not limited to the precise arrangements and organizations of the instrumentalities as herein shown and described.

With reference to the drawings in which like reference characters indicate like parts:

Figure 3 represents a longitudinal sectional view of the mounting section portion of a navigation device comprising my invention.

Figure 4 represents a transverse sectional view of the housing section illustrated in Figure 3, taken generally along lines 4—4 of Figure 3.

Figure 5 represents a plan view of the obverse side of a slide panel of a navigation device comprising my invention.

Figure 6 represents the reverse side of a slide panel of a navigation device comprising my invention.

Figure 7 represents a perspective view of a navigation device comprising a modified embodiment of my invention.

Figures 1, 2:
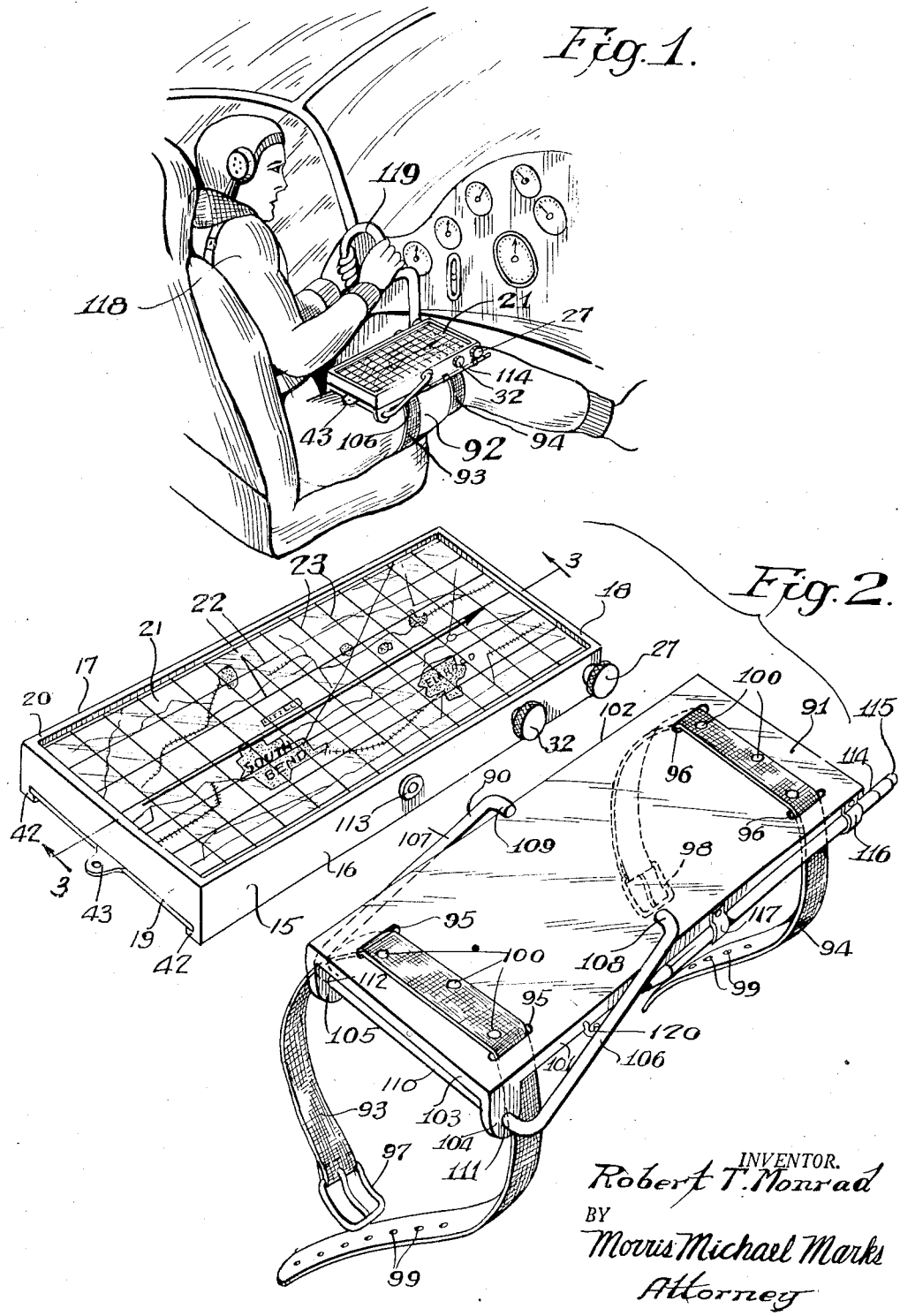
Figure 1 represents a fragmentary perspective view of the cockpit of an airplane, with a pilot seated therein and wearing a navigation device comprising my invention.
Figure 2 represents an expanded perspective view of a navigation device comprising my invention.

According to my invention, I provide a mounting section or housing 15 having side walls 16 and 17, and walls 18 and 19, and preferably a front wall 20. A window 21 is preferably disposed through the front wall 20, and may consist of a pane of transparent material such as glass, Lucite, or Plexiglas, or merely an opening. If desired, longitudinal scorings 22 and transverse scorings 23 may be disposed across the face of the window 21, and so spaced as to define areas of similar dimensions on a map disposed immediately beneath said window 21, and suitable scale indicia (not shown) may be disposed in proximity to said scorings, to relate said scorings to the appropriate scale of said map.

A roller 24 is disposed near one end 18 of the housing 15 and is rotatably mounted on spring clips 25 and 26 secured to the housing 15 in any desired manner. A knot 27 is disposed on the outside of the housing 15 and comprises a crankshaft 28 extending through the side wall 16 and into cranking relation to the roller 24. If desired, the knob 27 may be permanently secured to the housing 15 but longitudinally displaceable therein in a manner to engage and disengage the roller 24, as desired, thereby to enable said roller 24 to be removed from the housing or returned to operable position therein, and when so returned, to be enabled to be rotated by the cranking or turning of the knob 27. Also if desired, a suitable brake 29 may be disposed within the housing in operable juxtaposition to the roller 24 or the crank-shaft 28. This brake 29 may be a simple friction brake made of felt or similar material adapted to bear against and to hold the shaft against undesired rotation while permitting manual rotation thereof through the knob 27, or it may be a pawl-and-ratchet mechanism (not shown), or any other suitable means to prevent undesired rotation of the roller 24.

An idle roller 30 is disposed adjacent the opposite end 19 of the housing 15 and rotatably mounted in any suitable manner within said housing, with the axis of said roller 30 parallel to the axis of the roller 24.

A roller 31 is disposed within the housing 15 in general proximity to the roller 24, and parallel thereto, but beneath the plane defined by the axes of the rollers 24 and 30. The roller 31 is rotatably mounted between the side walls 16 and 17 by any suitable means such as a spring clip. A knob 32 is disposed on the outside of the housing 15 and coaxial with the roller 31, and comprises a crank-shaft (not shown) extending through the side wall 16 and into cranking relation to the roller 31. If desired, the structure and arrangement of the knob 32 and roller 31 may be similar to that of the knob 27 and the roller 24. The roller 31 may be slotted as at 33, and the roller 24 may be slotted as at 34. A platen 36 is preferably disposed beneath the window 21, spaced therefrom, and generally parallel thereto. This platen 36 may be secured to the housing 15 by any suitable brackets or blocks 37.

A strip map 38 is secured at one end to the roller 31, and at the other end to the roller 24. Any suitable means may be utilized for securing the map 38 to these rollers. Thus, for instance, one end of the map 38 may be inserted through the slot 33 of the roller 31 and another end of the map 38 may be inserted through the slot 34 of the roller 24. In mounting the map 38 within the housing 15, one end 39 of the map 38 is secured to and wrapped around the roller 31, and the map 38 is then passed about the idle roller 30, then between the platen 36 and the window 21, and on to the other roller 24; the other end 40 of the map 38 being then secured to the roller 24 and wrapped thereabout. In mounting the map within the housing 15, care is taken to dispose the cartographed face of the map toward the window 21.

A slide panel 41 is disposed within suitable slide grooves 42 formed within the side walls 16 and 17 and end walls 18 and 19, and is adapted when in registry with all of said grooves to close said housing 15, and when withdrawn from complete registry with all of said grooves to open said housing 15. A draw-tab 43 preferably projects from the end of said slide panel 41 which is adjacent the end wall 19 when the slide panel is in "closed" position with respect to the housing 15.

A tabular form 44 containing blank tables 45, 46, and 47, headed by suitable navigational indicia 48, is mounted on the end of the panel adjacent the draw-tab portion 43 thereof. A suitable transparent window 49 is preferably disposed over the tabular form 44 and is mounted within any suitable frame 50 secured by any desired means to the panel 41. The window 49, which may be of glass, Plexiglas, Lucite, or other suitable material, is preferably sanded or ground on its outer face operably to enable the pilot to write thereon with a graphite pencil on portions thereof over the tabular blanks, thereby to "fill in" the blanks with suitable data.

A navigational computer 51 preferably comprising a true index, compass rose, and sliding grid for computing true heading and wind drift problems, alternate airport problems and similar vector problems of navigation, is preferably mounted below the tabular form 44 on the slide panel 41. The tabular form 44 and the computer 51 together are disposed on the obverse face 52 of the slide panel 41. On the reverse face 53 of the slide panel 41 is disposed a navigational computer 88, comprising a circular slide rule, adapted to compute ground speed, time and distance problems, altitude and true air speed problems; and the slide panel 41 is so disposed with respect to the grooves 42 that it may be inserted therein with either the reverse or the obverse face projecting outwardly as desired.

In Figure 7 is illustrated a modified embodiment of my invention, wherein the panel and the mounting section are maintained as a unit while permitting the panel to be reversed whenever desired.

In this embodiment of my invention, I provide a mounting section 60 having end walls 61 and 62, side walls 63, 64, a front wall 65, and a rear wall 66 which may be formed by the end portions of the end and side walls 61, 62, 63, and 64. A yoke 67, preferably formed of heavy wire or a narrow gauge rod, and comprising side arms 68 and 69, a cross arm 70 and inwardly turned ends 71 and 72, is pivotly mounted within the mounting section 60 by means of the cross arm 70 projecting through suitable bearings 73 formed through the end walls 61 and 62 of the mounting section 60 adjacent one side wall 64 thereof, and of similar distances from the rear wall 66.

A panel 74 is provided, having an obverse face 75 and a reverse face 76, side edges 77 and 78 and end edges 79 and 80. The edges 77 and 78 are spaced substantially equal to the distance between the side walls 64 and 65 of the mounting section 60, and the edges 79 and 80 are spaced substantially equal to the distance between the end walls 61 and 62 of said mounting section. Lugs 81 and 82 are upwardly turned from, or otherwise formed on, the obverse side of the central portions of the end edges 79 and 80 respectively of the panel 74, and suitable bearings 83 and 84 are respectively formed through the lugs 81 and 82, and adapted to receive the inwardly turned ends 71 and 72 of the yoke 67. Suitable depressions 85 and 86 are formed in the end walls 61 and 62, and are adapted to receive the lugs 81 and 82 when the obverse face of the panel is turned inwardly toward the mounting section 60, and the housing closed.

In operation, when it is desired to substitute the inwardly turned reverse face 76 for the outwardly turned obverse face 75, it is merely necessary to lift the outer end 87 of the side arm 68, or the similar end of the side arm 69. This motion carries with it the panel 74, until the side edge 78 is free completely to rotate about the common axis of the inwardly turned ends 71 and 72 of the yoke 67. A slight pressure of the finger of the operator is then all that is necessary to swing the side edge 78 over toward the side wall 64 of the mounting section 63, and the operator then merely releases the side arm which he has lifted, and the panel 74 drops back into place on the rear wall 66 of the mounting section 60, with the reverse face 76 disposed outwardly. If it is desired to replace the reverse face with the obverse face, it is merely necessary to repeat the operation.

In either embodiment of my invention, the mounting section 15 or 60 is carried by a yoke 90 pivotly connected with a platform 91 which is adapted to be attached to the thigh 92 of a pilot's leg by means of suitable straps 93 and 94 which may be elastic, and are attached to the platform 91 by means of lacing through suitable slots 95, 96, or by any other desired means. The straps 93 and 94 are equipped with suitable means such as the buckles 97, 98, and buckle-holes 99, for holding the straps in place upon the thigh. Also, suitable knobs or other protuberances 100 may be disposed on either strap intermediate the slots 95 or the slots 96 to inhibit undesired displacement of the straps 93, 94, through their respective slots 95, 96.

The platform 91 has downwardly projecting from the sides 101 and 102 thereof in proximity to one end 103 of the platform 91, suitable bearing lugs 104 and 105.

The yoke 90 comprises the parallel side arms 106 and 107, inwardly turned ends 108 and 109, and a cross arm 110 preferably integrally connecting the side arms 106 and 107. The yoke 90 is preferably formed of heavy spring wire; and the cross arm 110 is disposed through the respective bearings 111 and 112 of the lugs 104 and 105, in a manner to permit pivotal displacement of said yoke with respect to said bearings.

The mounting section 15 or 60 has disposed in the center of the side walls thereof suitable bearings 113 adapted rotatably to receive the inwardly turned ends 108 and 109 of the yoke 90. In practice, the side arms 106 and 107 of the yoke 90 are sprung apart in order to permit the inwardly turned ends 108 and 109 to embrace the side walls 16 and 17 of the mounting section 15, or 63 and 64 of the mounting section 60; and the mounting section is passed between the inwardly turned yoke ends 108 and 109 until they are in juxtaposition to the bearings 113. The side walls 106 and 107 are then released and permitted to spring toward each other operably to urge the inwardly turned ends 108 and 109 into the bearings 113.

If desired, a pencil 114 carrying an eraser 115 is carried by the platform 91 by any suitable means such as the sleeves 116 and 117. The unit is now complete.

If desired, means other than the straps 93 and 94 may be used for securing the platform 91 to the thigh 92 of the pilot 118. Thus, for instance, suitable spring clips (not shown) may be used, or any other desired means may be used for securing the platform 91 to the thigh 92. Also, if desired, means other than the yoke 90 may be used for securing the mounting section to the platform. Thus, for instance, spring clips (not shown) may be secured to the side edges 101 and 102 of the platform, or to the end edges of the platform 91. In either event, the securing means should be such as to permit the free displacement of the mounting section operably to permit the upsetting thereof in a manner alternately to present the map face 20 or the computation chart face 41 thereof to the pilot 118.

In operation, the pilot secures the platform 91 to this thigh 92 by means of the straps 93, 94 or such other means as is provided on the platform 91. If his craft is guided by means of a wheel 119, he preferably straps this platform to the forward face of his right thigh 92, and if his craft is guided by a joy stick (not shown), he preferably mounts the platform 91 on the forward face of his left thigh. In either event, the strap should be secured tightly so that the platform will not tend to shift. The pilot 118 then secures the mounting section 15 or 60 to the platform 91 by means of the spring yoke 90, or such other means with which the platform 91 may be equipped. The navigation device is now securely carried in place, and the pilot is free to get up and walk about, sit down, or go through any of the various normal motions which may be expected of him, without injury to the navigation device. It is always carried in place, ready for use when he needs it, while being out of the way until he does need it.

When it is determined what course he will be required to take in flight, the pilot obtains the appropriate strip map covering the course that he intends to follow, sits down and turns the mounting section upside down so as to present the panel face thereof toward him. In the case of the platform 91 being equipped with the yoke 90, this is done by means of lifting either end 18 or 19 of the mounting section 60. As he does so, the mounting section pivots about the bearings 113 carried by the inwardly turned ends 108, 109 of the yoke 90, which in turn is pivoted about the cross arm 110 disposed in the bearing lugs 104, 105. Continued lifting of the end of the mounting section 15 or 60 continues the rotation thereof about the bearings 113 until the opposite end of the mounting section passes beneath the inwardly turned ends 108, 109 of the yoke 90, and further rotation in the same direction results in the complete upsetting of the mounting section, so that when the pilot now lowers the mounting section back onto the platform 91, the panel side is facing him.

The pilot now opens the housing by withdrawing the panel, and attaches one end of the strip map 38 to the roller 24, preferably passing it through the slot 34 thereof, passes the strip map 38 between the platen 36 and the window 21, around the idle roller 30, and secures the other end of the strip map to the roller 31, preferably through the slot 33 thereof. By suitable turning of the knobs 27 and 32, the pilot draws the strip map into taut condition with respect to the rollers 24, 30, and 31 and disposes the appropriate portion of the map relating to the location of his present airfield, in conjunction with the window 21. The pilot then returns the panel into place on the mounting section, with the tabular form 44 facing him. He then withdraws the pencil 114 from the sleeves 116, 117, and makes appropriate entries on the tables 45, 46 and 47 to give him the basis of his navigational computation. By resorting to the navigational computer 51, and where required, to the circular slide rule 88 on the reverse side of the panel, the pilot is enabled to complete his navigational computations and make appropriate entries on the tables 45, 46, and 47. He is now prepared to start his flight in accordance with the initial navigational computations.

During the course of the flight, the pilot again upsets the mounting section on the platform 91 and brings the window side uppermost. He then is free to refer to the strip map, turning the appropriate knobs 27, 32 in order continually to present to the window 21 the appropriate portion of the map to correspond to the actual land marks over which he is passing. Should the aircraft drift from its course, the pilot notes the extent of the drift by comparing actual landmarks with the corresponding marks on the map and their relation to the true course as indicated on the map. He then again upsets the mounting section and makes corrections on his tables in the tabular form 44, using the computers 51 and, when required, 88, in order to aid him in arriving at the correct figures. The eraser 115 of the pencil 114 enables him to erase the incorrect figures from the ground surface of the window 44 thereby to permit his re-insertion of the correct figures by the use of the graphite pencil 114. The pilot is then enabled to make the appropriate changes in his course in order to bring him back to the true course.

If desired an additional log, which may be known as a reference log, may be placed inside of the housing and facing the panel. This log (not shown) may be made in a manner similar to the log 44, and adapted to receive information of a more stable nature such as data relating to fuel consumption, radio stations and their beams, and other reference matter. The pilot writes this information on this log before commencing the flight, and refers to it during the flight by displacing the panel sufficiently to uncover the log. Also if desired, suitable spring clips (not shown) may be inserted within the mounting section between the rollers 24 and 31, to permit the insertion and retention of suitable rollers holding additional strip maps for other courses. Such rollers would then be readily available for taking the place of the map currently in use. In the modification of the device, illustrated in Figure 2, I have shown a hook 120 which may be mounted on the platform 91 or, if desired, on the mounting section 15; and adapted to receive and retain the draw tab 43 of the slide panel 41 when the pilot finds it necessary to withdraw the panel 41 entirely out of the grooves 42, as when he is changing map rollers or sometimes in entering data on the reference log. Furthermore, when the navigational device is to be used on the left leg of the pilot 118, instead of the right leg 92, the knobs 27 and 32 may be positioned on the opposite side 17 of the mounting section, so that they may be manipulated by the pilot's hand while his right hand is on the joy stick.

It will thus be seen that I have provided a unitary navigation device which is so constructed as to provide for every contingency which may arise in the usual navigational problem, with the parts thereof cooperating one with another to present the navigational instruments in their proper order for facile and ready use, and in such arrangement as to enable the pilot to use the device entirely with one hand while the other hand is engaged in piloting the craft.

It is to be understood that my invention is adaptable for use in craft other than those in the fields of aviation. Thus, it may be used in land vehicles or sea vessels, and is particularly appropriate for use by a pilot or driver who should retain one hand on the wheel while using the other hand for making appropriate notes, computations or references.

Moreover, my invention is adaptable for use by student pilots in order to familiarize them with fundamentals of navigation during their early flight training, by enabling said students to relate the strip map to the ground over which they are flying, and to make appropriate entries before and during the course of the flight, while computing elementary navigational problems relating thereto. This, of course, is in addition to the manifold other uses of my invention whereby pilots are enabled to pilot their craft, refer to the chart, and make appropriate navigational computations and entires, free of interference between these operations.

I am aware that the invention may be embodied in other specific forms without departing from the spirit or essential attributes thereof, and I therefore desire the present embodiments to be considered in all respects as illustrative and not restrictive, reference being had to the appended claims rather than to the foregoing description to indicate the scope of the invention.

Having thus described my invention, what I claim as new and desire to secure by Letters Patent is:

1. A navigation device comprising a mounting section having a forward face and a rearward portion; a platform; means to secure said platform to the forward thigh portion of a human body; means to secure said mounting section to said platform and operable longitudinally to reverse said forward face and said rearward portion with respect to said platform; a strip map positioned in proximity to said forward face; means operable to dispose selected portions of said map in viewable position in proximity to said forward face, said means including manually operated means positioned in proximity to the end of the mounting section which is disposed away from the torso of said human body when said rearward portion is in juxtaposition to said platform.

2. A navigation device comprising a mounting section having a forward face and a rearward portion; a platform; means to secure said platform to the forward thigh portion of a human body; means to secure said mounting section to said platform and operable longitudinally to reverse said forward face and said rearward portion with respect to said platform; a slide panel comprised in said rearward portion; navigational aids disposed on said slide panel; said slide panel being adapted to be longitudinally displaced with respect to said mounting section, and portions of said panel to be withdrawn from said mounting section at the end thereof positioned away from the torso of said human body when the forward face of said mounting section is in juxtaposition to said platform.

3. A navigation device comprising a mounting section having a forward face and a rearward portion; a platform; means to secure said platform to the forward thigh portion of a human body; means to secure said mounting section to said platform and operable longitudinally to reverse said forward face and said rearward portion with respect to said platform; a strip map positioned in proximity to said forward face; means operable to dispose selected portions of said map in viewable position in proximity to said forward face, said means including manually operated means positioned in proximity to the end of the mounting section which is disposed away from the torso of said human body when said rearward portion is in juxtaposition to said platform; a slide panel comprised in said rearward portion; navigational aids disposed on said slide panel; said slide panel being adapted to be longitudinally displaced with respect to said mounting section, and portions of said panel to be withdrawn from said mounting section at the end thereof positioned away from the torso of said human body when the forward face of said mounting section is in juxtaposition to said platform.

4. A navigation device comprising a mounting section having a forward face and a rearward portion; a map in juxtaposition to said forward face; a panel in juxtaposition to said rearward portion, said panel having opposing faces; navigational aids disposed on said opposing faces of said panel; means operable to enable said panel to be reversed in position with respect to said mounting section, whereby alternately to present for operation the navigational aids on one of said faces; a bearing, means adapted to secure said bearing to portion of the human body; a yoke pivotally journaled at one portion thereof within said bearing; another portion of said yoke being pivotally connected to said mounting section; the arrangement of parts being such as to enable said mounting section to be upset operably to transpose said forward and rearward faces.

ROBERT T. MONRAD.

REFERENCES CITED

The following references are of record in the file of this patent:

UNITED STATES PATENTS

| Number | Name | Date |
|---|---|---|
| 513,108 | Holman | Jan. 23, 1894 |
| 694,690 | Stark | Mar. 4, 1902 |
| 956,534 | Lahey | May 3, 1910 |
| 1,769,241 | Stephani | July 1, 1930 |
| 1,961,068 | Mix | May 29, 1934 |
| 1,972,263 | Hansen | Sept. 4, 1934 |